(12) United States Patent
Maguire

(10) Patent No.: US 12,477,348 B2
(45) Date of Patent: *Nov. 18, 2025

(54) PROVIDING SERVICE USING NETWORK SLICING

(71) Applicant: Sago Strategic Solutions LLC, Wilmington, DE (US)

(72) Inventor: Patrick Maguire, Athlone (IE)

(73) Assignee: Sago Strategic Solutions LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,255

(22) Filed: Mar. 8, 2024

(65) Prior Publication Data

US 2024/0214826 A1 Jun. 27, 2024

Related U.S. Application Data

(63) Continuation of application No. 17/278,735, filed as application No. PCT/EP2018/077805 on Oct. 11, 2018, now Pat. No. 11,937,091.

(51) Int. Cl.
*H04W 16/10* (2009.01)
*H04W 16/18* (2009.01)

(52) U.S. Cl.
CPC ........... *H04W 16/10* (2013.01); *H04W 16/18* (2013.01)

(58) Field of Classification Search
CPC .............................. H04W 16/10; H04W 16/18
See application file for complete search history.

(56) References Cited

U.S. PATENT DOCUMENTS

2011/0019715 A1* 1/2011 Brisebois ............. H04B 7/0871
455/132
2022/0078870 A1* 3/2022 Park ........................ H04W 8/08

FOREIGN PATENT DOCUMENTS

WO WO-2018030867 A1 * 2/2018 ........... H04B 17/318

* cited by examiner

*Primary Examiner* — Samina F Choudhry
(74) *Attorney, Agent, or Firm* — Thorpe North & Western, LLP.

(57) ABSTRACT

A network node in a telecommunications network stores information defining at least one network slice. For at least one defined network slice, information is stored identifying a plurality of cells that define at least a part of a boundary of a coverage area of the network slice. The operation of a cell is then adapted depending on whether or not the cell defines at least a part of the boundary of the coverage area of the network slice.

17 Claims, 8 Drawing Sheets

PROVIDING SERVICE USING NETWORK SLICING

PRIORITY DATA

This application is a continuation of U.S. application Ser. No. 17/278,735, filed Mar. 23, 2021, which is a 371 of International Application No. PCT/EP2018/077805, filed on Oct. 11, 2018, all of which are incorporated herein by reference.

TECHNICAL FIELD

This relates to network slicing, and in particular to providing service to user equipment devices when network slicing is used.

BACKGROUND

An architecture for a wireless communications network, which may be referred to as the 5G system, or as the Next Generation Radio (NR) network, is defined in the document 3GPP TS 23.501 V15.3.0.

This defines a cellular network, and also defines the concept of network slicing, as a mechanism to provide improved service to users. A network slice comprises a portion of the available network resources. A network slice is identified by a Single Network Slice Selection Assistance Information (S-NSSAI), which includes a Slice/Service type (SST), which refers to the expected Network Slice behaviour in terms of features and services; and may also include a Slice Differentiator (SD), which is optional information that complements the Slice/Service type(s) to differentiate amongst multiple Network Slices of the same Slice/Service type.

In the defined cellular network, the finest granularity of service area restriction is a Tracking Area (TA), where a Tracking Area contains one or (usually) more than one cell. This implies that the minimal coverage of any slice is one Tracking Area (TA). In management and orchestration systems which deploy network slices, based on service request received, the orchestration & management system must among other tasks determine what is the coverage requirement associated in the service request. The outcome will be a defined set of one or more tracking areas. The network will then be configured to associate the deployed Network (NW) Slice with the identified tracking areas. The configured TA(s) define the area within which user equipment or other devices associated with the NW Slice are restricted, mobility wise for access to the supported service(s) in the NW Slice.

As mentioned above, a tracking area is a logical entity representing the aggregation of one or many cells. While cells in certain scenarios (e.g. indoor deployments, or Narrow Band Internet of Things (NB-IOT)) could be a dedicated to one NW slice, for the majority of outdoor scenarios, the logical cell and its associated physical radio resources are shared, and are not dedicated to one NW slice.

Therefore, the resources of a tracking area (and its associated cells) will be shared by those devices which are permitted access to services in all deployed NW slices requiring this coverage, and possibly by those devices that are not associated to any particular NW slice (i.e. devices which have full network coverage service) (i.e. devices not authorized to use services on any of the NW slices).

The document 3GPP TS 38.300 V15.3.0 sets out some key points related to network slicing, namely:—
Resource Management Between Slices The Next Generation Radio Access Network (NG-RAN) supports policy enforcement between slices as per service level agreements. It should be possible for a single NGRAN node to support multiple slices. The NG-RAN should be free to apply the best RRM policy for the service level agreement (SLA) in place to each supported slice.

Resource Isolation Between Slices

The NG-RAN supports resource isolation between slices. NG-RAN resource isolation may be achieved by means of RRM policies and protection mechanisms that should avoid that shortage of shared resources in one slice breaks the service level agreement for another slice. It should be possible to fully dedicate NG-RAN resources to a certain slice. How NG-RAN supports resource isolation is implementation dependent.

Slice Availability

Some slices may be available only in part of the network. Awareness in the NG-RAN of the slices supported in the cells of its neighbors may be beneficial for inter-frequency mobility in connected mode.

Granularity of Slice Awareness

Slice awareness in NG-RAN is introduced at POU session level, by indicating the SNSSAI corresponding to the Protocol Data Unit (POU) Session, in all signaling containing POU session resource information.

Mobility

To make mobility slice-aware in case of Network Slicing, S-NSSAI is introduced as part of the POU session information that is transferred during mobility signaling. This enables slice-aware admission and congestion control.

In summary, key aspects in NR for NW Slicing include:
1. SLA compliance per slice using;
 a. Enabling RRM policies and protection mechanisms
 b. Enabling Inter-frequency mobility optimization
 c. Enabling Admission and Congestion control optimization.

Certain optimizations can be achieved in admission, congestion and mobility by using slice aware mechanisms, such as mapping the slice S-NSSAI to supported TA(s) and their associated cells, and giving consideration to slice availability aspects, such as partial network coverage, overlapping slice coverage etc.

SUMMARY

The optimization mechanisms discussed above fail to recognize that cells cannot all be treated the same. Specifically, these mechanisms fail to recognize that the policies and protection mechanisms that will be applied in the cells of a network slice can advantageously differ, depending on whether the cell is at the coverage boundary or not. It is an aim of the present disclosure to provide a method, apparatus and computer readable medium which at least partially address one or more of the challenges discussed above.

According to a first aspect of the present invention, there is provided a method of operation of a network node in a telecommunications network, the method comprising: storing information defining at least one network slice;
 for at least one defined network slice, storing information identifying a plurality of cells that define at least a part of a boundary of a coverage area of the network slice; and
adapting the operation of a cell depending on whether or not the cell defines at least a part of the boundary of the coverage area of the network slice.

The method may further comprise storing information defining a slice type of each defined network slice.

The method may further comprise, for a plurality of cells in the coverage area of the network slice:
  comparing a neighbour cell list of said cell against a list of cells in the coverage area of the network slice;
  if one or more cell appearing in said neighbour cell list does not appear in the list of cells in the coverage area of the network slice, determining that said cell defines at least a part of the boundary of the coverage area of the network slice; and
  based on said determining, storing the information identifying the plurality of cells that define at least a part of the boundary of the coverage area of the network slice.

The steps of (a) comparing a neighbour cell list of said cell against a list of cells in the coverage area of the network slice; (b) if one or more cell appearing in said neighbor cell list does not appear in the list of cells in the coverage area of the network slice, determining that said cell defines at least a part of the boundary of the coverage area of the network slice; and (c), based on said determining, storing the information identifying the plurality of cells that define at least a part of the boundary of the coverage area of the network slice may be performed for each cell in the coverage area of the network slice.

The step of adapting the operation of a cell may comprise:
  when providing service to a user equipment device by means of a defined network slice, adapting the service depending on whether or not the user equipment device is in a cell that defines at least a part of the boundary of the coverage area of the network slice.

The step of adapting the service provided to a user equipment device may comprise determining whether to admit the user equipment device to the cell.

The step of adapting the service provided to a user equipment device may comprise determining whether to handover the user equipment device from the cell.

The method may comprise:
  determining whether a cell served by a radio node is a boundary cell of one or more network slice; and
  if the cell is not a boundary cell of any network slice, powering down the radio node to save energy if one or more criterion is met; and
  if the cell is a boundary cell of one or more network slice, keeping the radio node powered up, even if the one or more criterion is met.

According to another aspect, there is provided a network node for a telecommunications network, the network node comprising a processing circuitry and a memory. The memory containing instructions executable by the processing circuitry such that the network node is operative to store information defining at least one network slice and to store information identifying a plurality of cells that define at least a part of a boundary of a coverage area of the network slice for at least one defined network slice. Further, the network node is operative to adapt the operation of a cell depending on whether or not the cell defines at least a part of the boundary of the coverage area of the network slice.

The network node may be operative to store information defining a slice type of each defined network slice.

The network node may be operative to, for a plurality of cells in the coverage area of the network slice:
  compare a neighbour cell list of said cell against a list of cells in the coverage area of the network slice;
  if one or more cell appearing in said neighbour cell list does not appear in the list of cells in the coverage area of the network slice, determine that said cell defines at least a part of the boundary of the coverage area of the network slice; and
  based on said determining, store the information identifying the plurality of cells that define at least a part of the boundary of the coverage area of the network slice.

The network node may be operative to perform said steps for each cell in the coverage area of the network slice.

The network node, when adapting the operation of a cell, may be operative to, when providing service to a user equipment device by means of a defined network slice, adapt the service depending on whether or not the user equipment device is in a cell that defines at least a part of the boundary of the coverage area of the network slice.

The network node, when adapting the service provided to a user equipment device, may be operative to determine whether to admit the user equipment device to the cell.

The network node when adapting the service provided to a user equipment device may be operative to determine whether to handover the user equipment device from the cell.

The network node when adapting the operation of a cell may be operative to:
  determine whether a cell served by a radio node is a boundary cell of one or more network slice; and
  if the cell is not a boundary cell of any network slice, power down the radio node to save energy if one or more criterion is met; and
  if the cell is a boundary cell of one or more network slice, keep the radio node powered up, even if the one or more criterion is met.

According to a further aspect, there is provided a computer program product, comprising computer readable code, configured for causing a suitable programmed processor to perform a method according to the first aspect.

According to a still further aspect, there is provided a computer program product, comprising a tangible computer readable medium, containing computer readable instructions for causing a processor to perform a method comprising:
  storing information defining at least one network slice;
  for at least one defined network slice, storing information identifying a plurality of cells that define at least a part of a boundary of a coverage area of the network slice; and
  adapting the operation of a cell depending on whether or not the cell defines at least a part of the boundary of the coverage area of the network slice.

Thus, there is disclosed a method of operation of a cell in a telecommunications network, the method comprising:
  determining whether the cell defines at least a part of a boundary of a coverage area of a network slice; and
  adapting the operation of the cell, depending on whether or not the cell that defines at least a part of the boundary of the coverage area of the network slice.

Thus, cells which form part of the coverage boundary of a network slice are identified, and this helps to enable optimization of the radio network in areas such as admission, congestion, mobility and energy efficiency.

DETAILED DESCRIPTION

Figure 1:
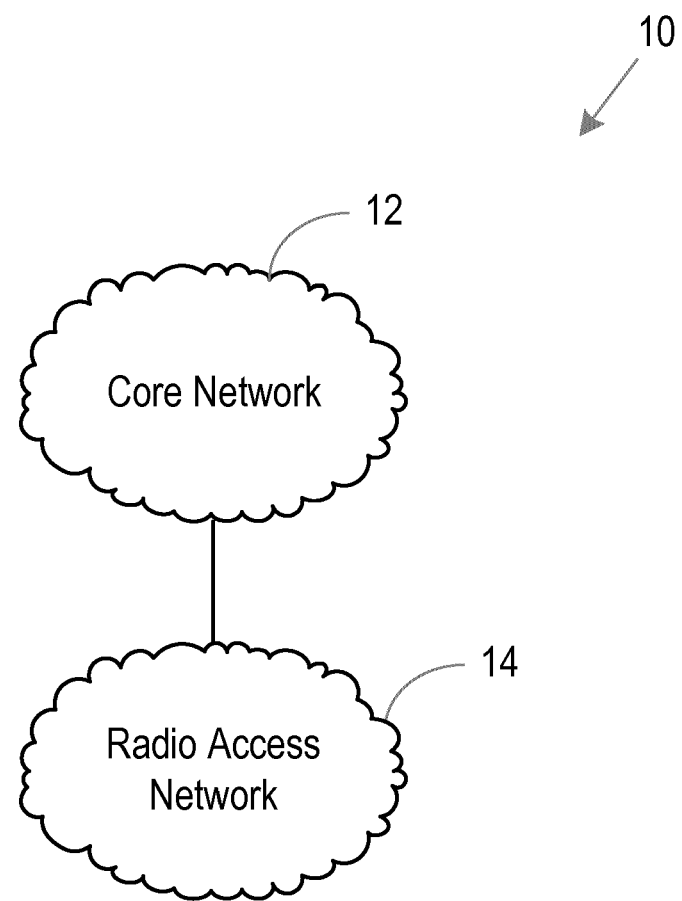
FIG. 1 is a schematic diagram of a wireless communications network.

FIG. 1 is a schematic diagram of a wireless communications network 10.

The network 10 may for example be a network that is referred to as a 5G network, or as a Next Generation Radio (NR) network, the architecture of which is defined in the document 3GPP TS 23.501 V15.3.0.

In very general terms, the network 10 includes a core network 12 and a radio access network 14.

The radio access network 14 includes physical radio nodes, which include transceivers that are able to communicate with wireless devices within their coverage areas. The wireless devices may be User Equipment (UE) devices such as smartphones or tablet computers, or they may be devices that automatically connect to the network such as tracking devices, and they may be mobile or may be station, for example in the form of remote sensing devices. When the term User Equipment (UE) device is used herein, it may refer to any wireless device that is able to communicate with the network.

Figure 2:
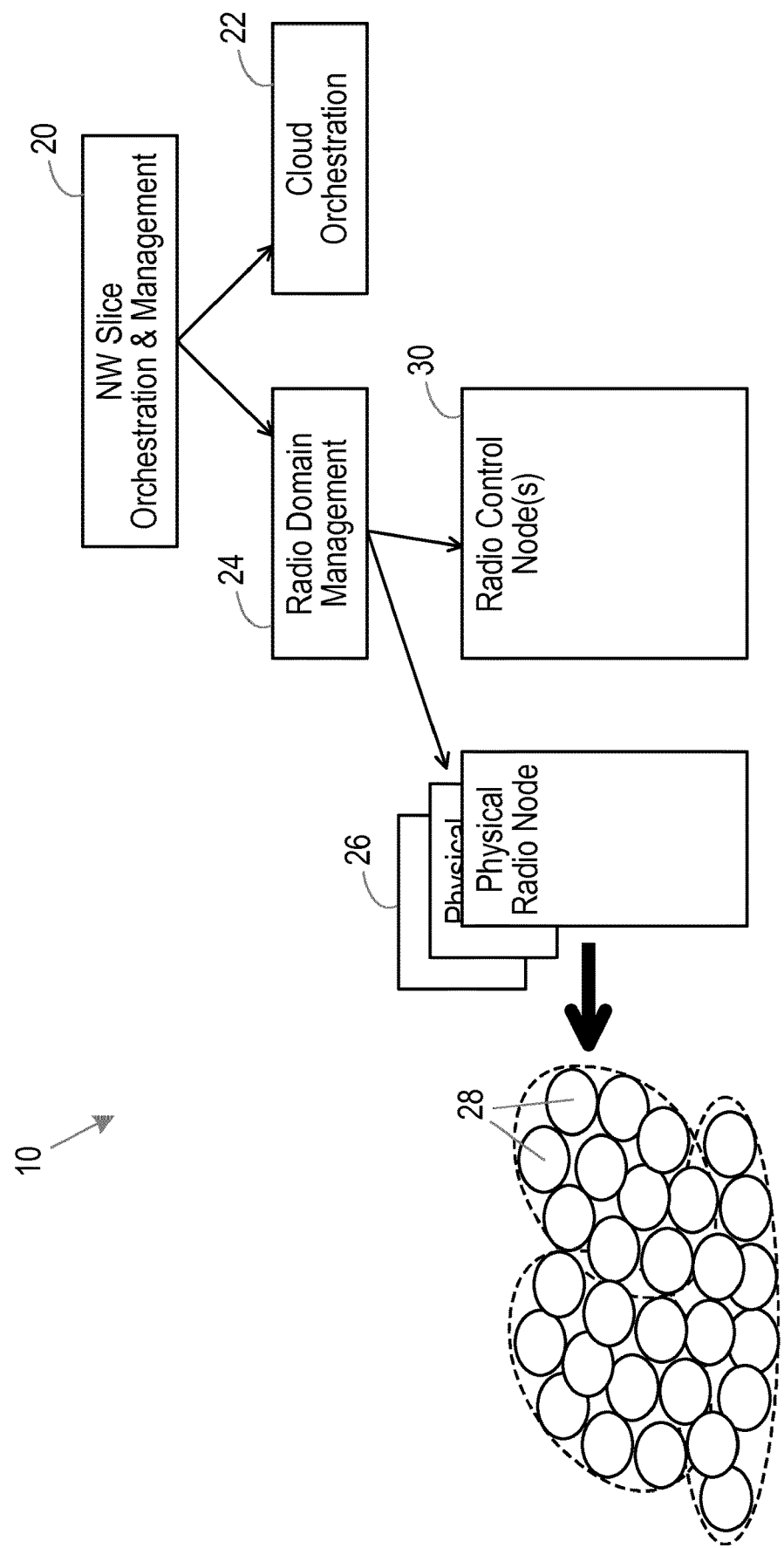
FIG. 2 illustrates one implementation of the wireless communications network.

FIG. 2 illustrates one implementation of the wireless communications network 10, and in particular shows the components of the network 10 that are used for the management and control of network slicing. Specifically, FIG. 2 shows the network 10 as including a network (NW) slice orchestration and management node 20. The NW slice orchestration and management node 20 deploys resources by means of a cloud orchestration node 22. Specifically, the cloud orchestration node 22 can orchestrate the network resources and the network slicing services.

FIG. 2 also shows the network 10 as including a radio domain management node 24, through which the network resources allocated for network slices are configured.

The radio access network of the network 10 includes multiple physical radio nodes 26, each of which provides service to one or more associated cells 28.

In a Long-Term Evolution (LTE) Physical Network Function (PNF) deployment, the physical radio nodes 26 are referred to as eNodeB's. In this case, the physical radio nodes 26 are preconfigured with various policies and control mechanisms, for example relating to admission, congestion control, mobility and energy efficiency. In a network as illustrated here, using network slicing, the physical radio nodes 26 are preconfigured with policies and control mechanisms to be applied to network slices.

In a Next Generation Radio (NR) deployment, the network 10 typically includes multiple Radio Control Nodes 30, hosting the radio control function (RCF), and the Radio Control Nodes are preconfigured with policies and control mechanisms, for example relating to admission, congestion control, mobility and energy efficiency, and these may include policies and control mechanisms to be applied specifically to network slices.

Figure 3:
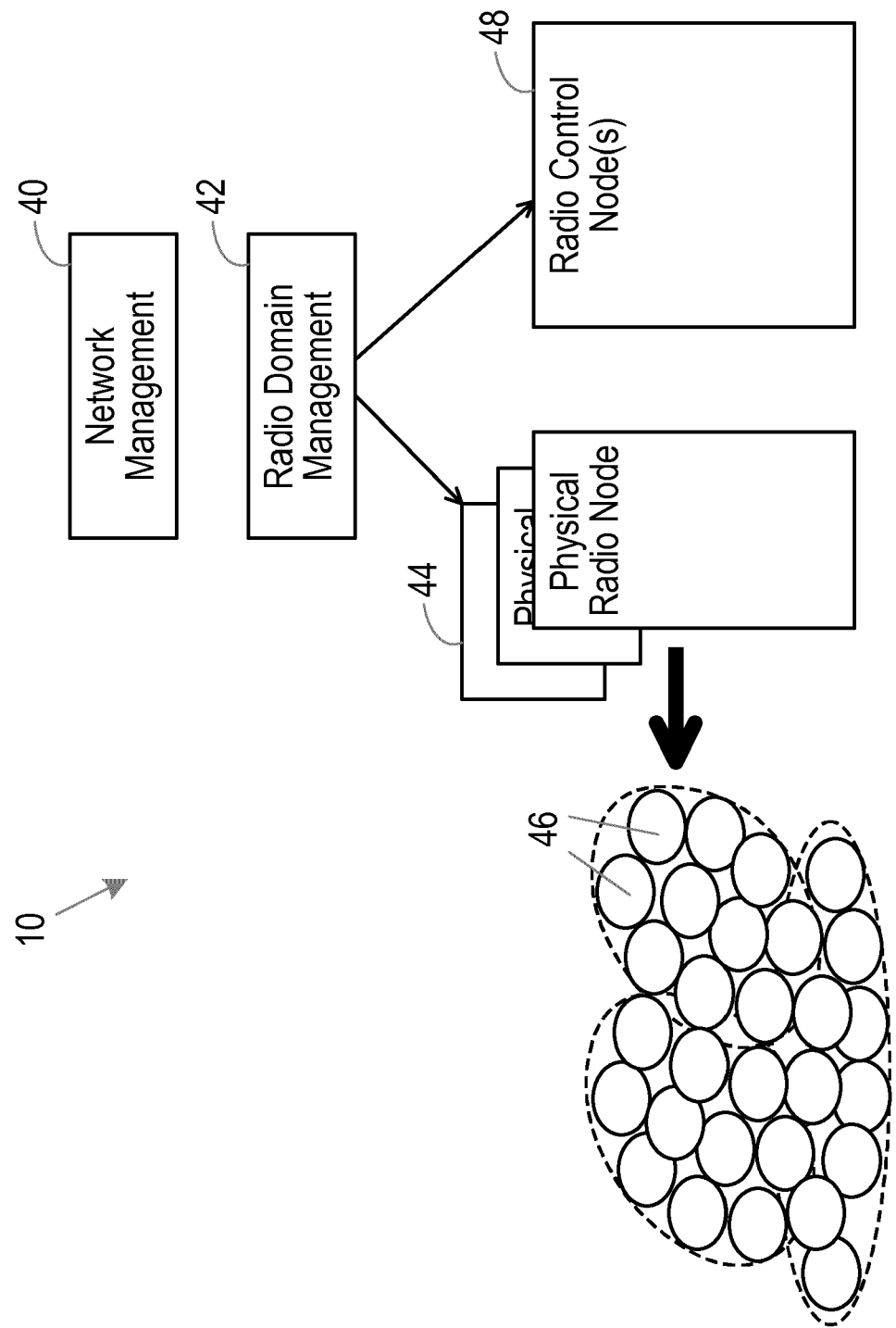
FIG. 3 illustrates a different implementation of the wireless communications network.

FIG. 3 illustrates an alternative implementation of the wireless communications network 10, and shows the components of the network 10 that are used for the management and control of network slicing in this implementation. Specifically, FIG. 3 shows the network 10 as including a network management node 40. The network management node 40 oversees a radio domain management node 42, through which the network resources allocated for network slices are configured.

The radio access network of the network 10 includes multiple physical radio nodes 44, each of which provides service to one or more associated cells 46.

In a Long-Term Evolution (LTE) Physical Network Function (PNF) deployment, the physical radio nodes 44 are referred to as eNodeB's. In this case, the physical radio nodes 44 are preconfigured with various policies and control mechanisms, for example relating to admission, congestion control, mobility and energy efficiency. In a network as illustrated here, using network slicing, the physical radio nodes 44 are preconfigured with policies and control mechanisms to be applied to network slices.

In a Next Generation Radio (NR) deployment, the network 10 typically includes multiple Radio Control Nodes 48, hosting the radio control function (RCF), and the Radio Control Nodes are preconfigured with policies and control mechanisms, for example relating to admission, congestion control, mobility and energy efficiency, and these may include policies and control mechanisms to be applied specifically to network slices.

In any of the implementations described with reference to FIG. 2 or FIG. 3, in order to deploy a NW slice, the required virtualized resources are first allocated and connected. All resources (both physical and virtual) are then configured to meet the service requirements associated with the specified service request which triggered the NW slice deployment. From a radio perspective, this implies that the required radio coverage is allocated and the associated radio resources are configured.

There is described herein an algorithm for determining which policies to apply to a network slice, and to UE devices that are being served by a cell that forms part of a network slice.

The algorithm may be deployed in any suitable node of the network. For example, in the network shown in FIG. 2, the algorithm may be deployed in the NW Slice orchestration and management node 20, or in the radio domain management node 24, or in each of the physical radio edge nodes 26, or in the or each Radio Control Node 30. Similarly, in the network shown in FIG. 3, the algorithm may be deployed in the network management node 40, in the radio domain management node 42, in each physical radio edge node 44, or in each Radio Control Node 48. Configuration related to the algorithm, either at system level or at cell level, will be controlled from and persisted in the radio domain management node 24, 42.

Figure 4:
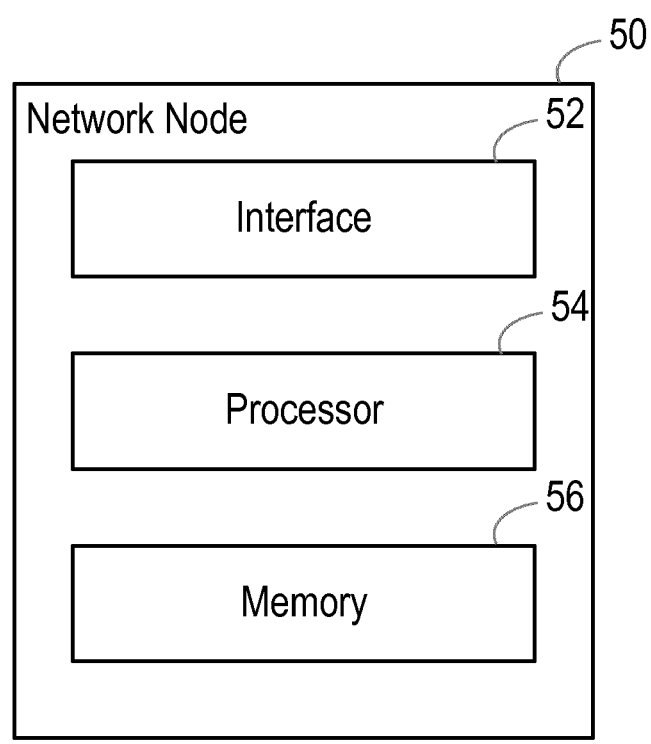
FIG. 4 is a schematic illustration of a network node.

FIG. 4 illustrates the general form of any of these nodes in which the algorithm may be deployed.

Specifically, the relevant network node 50 includes one or more interface 52, which may be used to communicate with other network nodes and/or, in the case where the network node 50 is a physical radio node, with UE devices being served by the node.

The network node 50 also includes a processing circuitry 54, for performing the algorithm.

The network node 50 also includes a memory 56 for storing data, and for storing program instructions for causing the processing circuitry 54 to perform the algorithm.

In one embodiment the interface 52 the processing circuitry 54 and the memory 56 may be connected in series, whereas in an alternative embodiment these elements may be connected to a bus.

Figure 5:
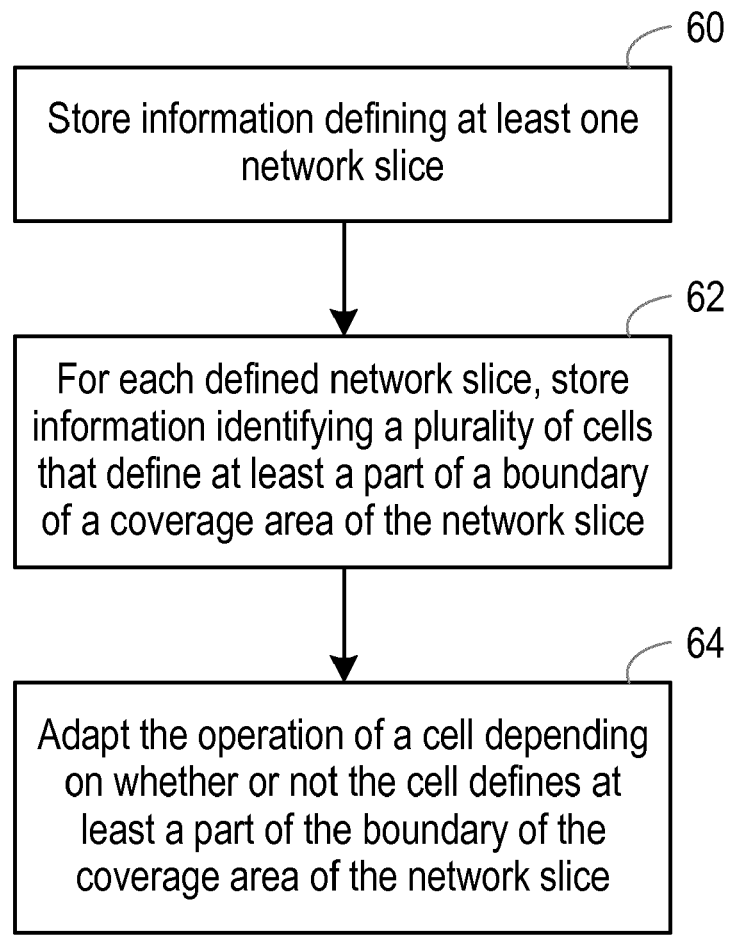
FIG. 5 is a flow chart, illustrating a method performed in a network node.

FIG. 5 is a flow chart, illustrating a method performed in a network node.

At step 60 of the method shown in FIG. 5, the network node stores information defining at least one network slice.

For example, the information that is stored may comprise information defining a slice type of each defined network slice.

In addition, the information that is stored may comprise information identifying the cells that define at least a part of the boundary of the coverage area of the network slice.

Figure 6:
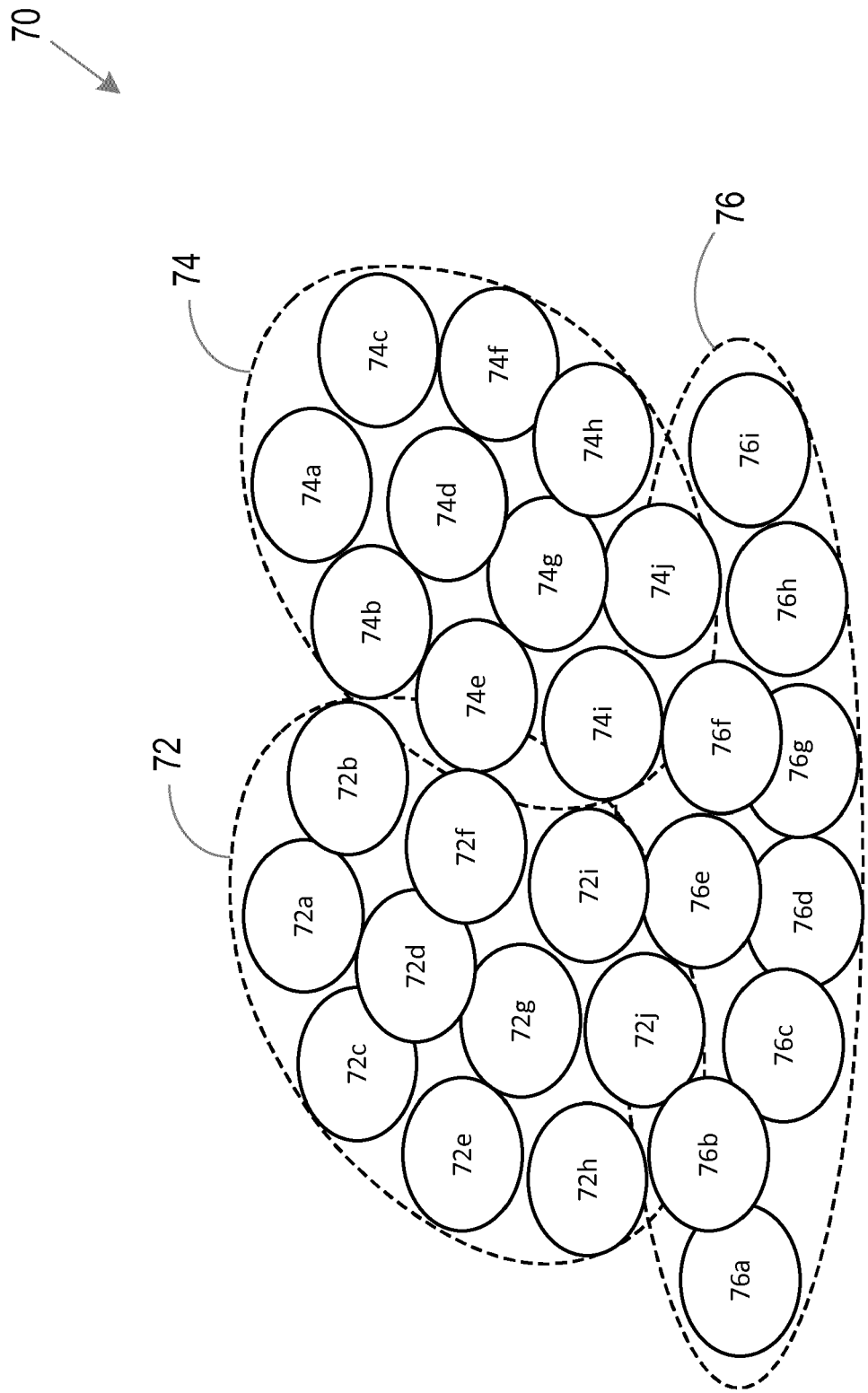
FIG. 6 illustrates cells, tracking areas, and network slices in the wireless communications network.

FIG. 6 illustrates a part of the network in which the method is deployed. Specifically, the network 70 includes multiple cells, each of which is served by a physical radio node, which is not shown in FIG. 5. The cells are divided into tracking areas (TA). Thus, in FIG. 6, three tracking areas 72, 74, 76 are shown. The tracking area 72 includes cells 72*a*, 72*b*, . . . , 72*j*; the tracking area 74 includes cells 74*a*, 74*b*, . . . , 74*j*; and the tracking area 76 includes cells 76*a*, 76*b*, . . . , 76*i*.

In this illustrated embodiment, three network slices are defined. A first network slice covers tracking areas 72, 74; a second network slice covers tracking areas 74, 76; and a third network slice covers tracking areas 72, 76.

Information about each slice is stored in the relevant network node(s). This information may for example indicate the cells and or tracking area(s) that make up the slice. In addition, the information that is stored about the slice may include an indication of the slice type. For example, some slices may be configured in such a way that they provide a high bandwidth (for example for streaming mobile entertainment services), while other slices may be defined in such a way that they provide an ultra-reliable connection.

In addition, a preliminary algorithm may be enabled or disabled. The preliminary algorithm provides information to be stored and used in the method of FIG. 5. As described in more detail below, the method of FIG. 5 distinguishes between the cells that define the boundary of a network slice, and the cells that are not part of the boundary of the network slice.

In order to identify the cells that define the boundary, the neighbour lists of the cells in the network slice may be used. Specifically, in this one embodiment, for a plurality of individual cells in the coverage area of the network slice, the neighbour cell list of that individual cell is compared against the full list of cells in the coverage area of the network slice. If one or more cell appearing in the neighbour cell list does not appear in the list of cells in the coverage area of the network slice, it may be determined that that cell defines at least a part of the boundary of the coverage area of the network slice. In some embodiments, the steps of (a) comparing the neighbour cell list of the individual cell against the full list of cells in the coverage area of the network slice and (b) determining that that individual cell defines at least a part of the boundary of the coverage area of the network slice if one or more cell appearing in the neighbour cell list does not appear in the list of cells in the coverage area of the network slice, are performed for each individual cell in the coverage area of the network slice.

Figure 7:
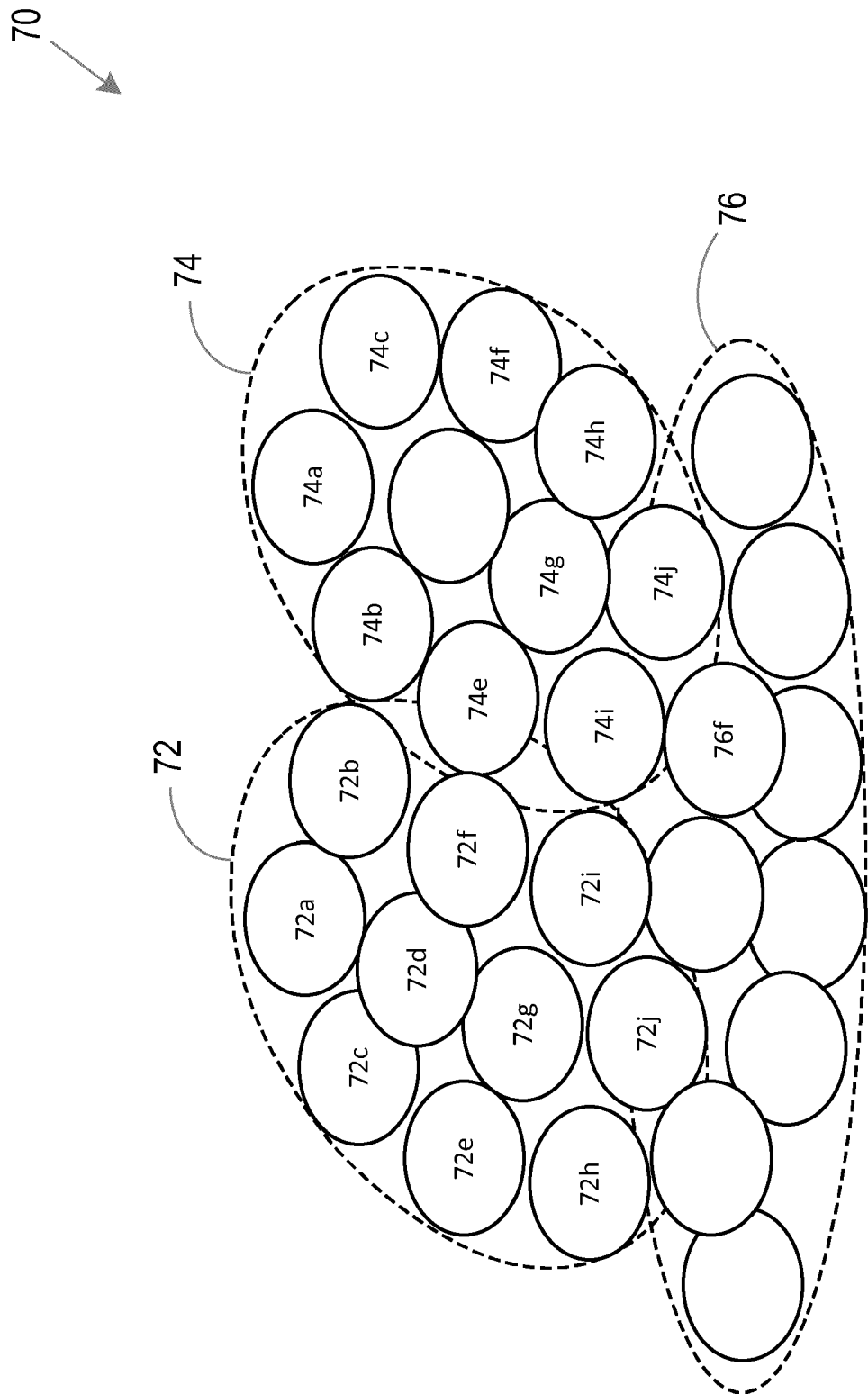
FIG. 7 further illustrates cells, tracking areas, and network slices in the wireless communications network.

This is illustrated with reference to FIG. 7. Specifically, FIG. 7 shows a situation where the network slice that is under consideration is the network slice that is made up of the tracking areas 72, 74.

Firstly, the cell 72*f* is considered. The neighbour list of cell 72*f* includes the cells 72*b*, 72*d*, 72*g*, 72*i*, 74*e*, and 74*i*. All of these cells in the neighbour cell list of cell 72*f* appear in the list of cells in the coverage area of the network slice, and so it may be determined that the cell 72*f* does not define a part of the boundary of the coverage area of the network slice.

Then, the cell 74*i* is considered. The neighbour list of cell 74*i* includes the cells 72*f*, 72*i*, 74*e*, 74*g*, 74*j*, and 76*f*. Since the cell 76*f* that appears in the neighbour cell list does not appear in the list of cells in the coverage area of the network slice, it may be determined that the cell 74*i* defines at least a part of the boundary of the coverage area of the network slice.

Thus, the cells that define the boundary of the network slice that is made up of the tracking areas 72, 74 would be the cells 72*a*, 72*b*, 72*c*, 72*e*, 72*h*, 72*i*, 72*j*, 74*a*, 74*b*, 74*c*, 74*e*, 74*f*, 74*h*, 74*i*, and 74*j*.

It will also be noted that, while cells such as the cells 72*a*, 72*c*, and 72*e* are in the boundary of the network slice that is made up of the tracking areas 72, 74, the same cells are also in the boundary of the network slice that is made up of the tracking areas 72, 76, and it will also be noted that these network slices may be of different types.

By contrast, it was noted above that the cell 72*f* does not define a part of the boundary of the coverage area of the network slice that is made up of the tracking areas 72, 74. However, the cell 72*f* does define a part of the boundary of the coverage area of the network slice that is made up of the tracking areas 72, 76.

Thus, for each defined network slice, as shown at step 62 of the method of FIG. 5, information is stored identifying a plurality of cells that define at least a part of a boundary of a coverage area of the network slice. This information may be stored in a control node serving multiple cells, and/or may be stored in a radio node serving only one cell. In that case, as mentioned above, the cell may be identified as a boundary cell for one or more network slice, and as a non-boundary cell for one or more other network slice.

The stored information may be used to identify, for each network slice, the cells that are boundary cells and the cells that are non-boundary cells. Equivalently, the stored information may be used to identify, for each cell, the network slices for which that cell is a boundary cells and the network slices for which that cell is a non-boundary cell.

Then, policies that apply to the relevant network slice are pre-configured, for example by a control node of the network, and stored for use by each cell.

As described above, a preliminary algorithm provides information to be stored and used in the method of FIG. 5. As described in more detail below, the method of FIG. 5 distinguishes between the cells that define the boundary of a network slice, and the cells that are not part of the boundary of the network slice.

Figure 8:
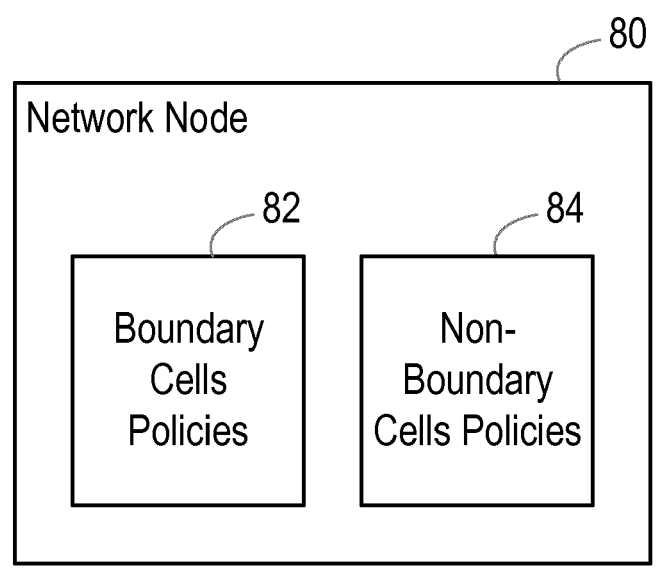
FIG. 8 illustrates the operation of a network node.

FIG. 8 illustrates a network node 80, which stores, for at least one cell, policies 82 that apply to network slices for which that cell is a boundary cell, and policies 84 that apply to network slices for which that cell is not a boundary cell. The policies 82, 84 may include policies and control mechanisms that are specific to NW Slices. The policies may relate to issues such as admission control, congestion control, mobility and energy efficiency.

Then, as shown at step 64 of the method of FIG. 5, the operation of a cell is adapted depending on whether or not the cell defines at least a part of the boundary of the coverage area of the network slice.

As described above, the network node 80 may be a radio node, providing service to a specific cell. In that case, the policies 82, 84 may relate to the operation of the network node and the cell, or to the service provided to a UE device for which that is the serving cell.

In addition, or alternatively, the network node 80 may be a control node, acting to control one or more radio nodes. In that case, the policies 82, 84 may relate to the operation of the radio node, and/or to the service provided to UE devices whose serving cell is one of the cells covered by those radio nodes.

One way in which the information covering the boundary cells can be used is to never shut down a border cell for energy efficiency. Thus, the operation of a cell, and hence the operation of a network node in the form of a radio node serving that cell, may be controlled either by the radio node itself or by an appropriate control node. It may be determined whether a cell served by the radio node is a boundary cell of one or more network slice. If the cell is not a boundary cell of any network slice, the radio node may be powered down to save energy if one or more criterion is met. This is a known feature of radio nodes. However, if the cell is a boundary cell of one or more network slice, the radio node may be kept powered up, even if the one or more criterion is met. Thus, boundary cells are treated differently, in order to improve the overall network operation.

One way in which the information covering the boundary cells can be used is to adapt the service provided to UE devices. The service provided in non-boundary cells may be the same as in existing networks, while the service provided in boundary cells may be adapted to optimize throughput and to protect the Service Level Agreements of services associated with NW Slices.

One example of this concerns admission control.

In a first situation, a first UE, UE111, is not using a network slice, and is connected to a cell that is outside the coverage area of a network slice NWS1, while a second UE, UE112, is using the network slice NWS1, and is connected to a cell that is inside the coverage area of the network slice NWS1. The two UEs, UE 111 and UE 112 are both requesting admission to a cell C11 that is in the coverage area of the network slice NWS1, but is not a boundary cell of the network slice NWS1. In this situation, when only one of the two UEs may be admitted to the cell C11 (for example because of cell loading), existing policies are applied to determine which of the two UEs is to be admitted to the cell C11. Referring to FIG. 8, it is a policy 84, applying to network slices for which that cell is not a boundary cell, that is applied.

In a second situation, a first UE, UE121, is not using a network slice, and is connected to a cell that is outside the coverage area of the network slice NWS1, while a second UE, UE122, is using the network slice NWS1, and is connected to a cell that is inside the coverage area of the network slice NWS1. The two UEs, UE121 and UE122 are both requesting admission to a cell C12 that is in the coverage area of the network slice NWS1, and is a boundary cell of the network slice NWS1. In this situation, when only one of the two UEs may be admitted to the cell C12 (for example because of cell loading), adapted policies are applied to determine which of the two UEs is to be admitted to the cell C12. Referring to FIG. 8, it is a policy 82, applying to network slices for which that cell is a boundary cell, that is applied.

The adapted policy 82 may be such that it gives more preference to UE122, which is requesting admission to the boundary cell, than to UE112 in the first situation, which was requesting admission to the non-boundary cell.

Another example of the adaptation of service in boundary cells concerns handover.

In this case, in a first situation, a first UE, UE211, is using a service associated with a network slice NWS2, and is connected to a cell C21 that is inside the coverage area of the network slice NWS2. A second UE, UE212, is not associated with any network slice, but is also connected to the cell C21. The cell C21 is inside the coverage area of the network slice NWS2, but is not a boundary cell of the network slice NWS2. If both UE211 and UE212 are located near the cell edge of the cell C21, and the load increases in the cell, existing policies are applied to determine which of the two UEs is to be handed over from the cell C21. Referring to FIG. 8, it is a policy 84, applying to network slices for which that cell is not a boundary cell, that is applied.

In a second situation, a first UE, UE221, is using a service associated with the network slice NWS2, and is connected to a cell C22 that is inside the coverage area of the network slice NWS2. A second UE, UE222, is not associated with any network slice, but is also connected to the cell C22. The cell C22 is inside the coverage area of the network slice NWS2, but it is a boundary cell of the network slice NWS2. If both UE221 and UE222 are located near the cell edge of the cell C22, and the load increases in the cell, adapted policies are applied to determine which of the two UEs is to be handed over from the cell C22. Referring to FIG. 8, it is a policy 82, applying to network slices for which that cell is a boundary cell, that is applied.

The adapted policy 82 may be such that it gives more preference to allowing the UE UE221 to remain connected to its current serving cell, because that cell is a boundary cell, than to allowing the UE UE212 in the first situation to remain connected to its serving cell, which was a non-boundary cell. This helps to avoid the situation where the SLA of the UE UE221 is breached because the UE is handed over.

A third example of the adaptation of service in boundary cells also concerns handover. In this example, two UEs, UE311 and UE312, are being served by the same cell C31. The first UE, UE311, is using a service associated with a network slice NWS3, and the cell C31 is inside the coverage area of the network slice NWS2. Specifically, the cell C31 is a boundary cell of the network slice NWS3. The second UE, UE312, may not be associated with any network slice. However, the same situation applies if UE312 is using a service associated with a different network slice NWS4, and the cell C31 is inside the coverage area of the network slice NWS4 and is a non-boundary cell of the network slice NWS4.

If the load conditions in the cell C31 require a handover, UE311 and UE312 are both potential handover candidates, and for the purposes of this example it is assumed that the target cell in each case is a cell that is outside the coverage area of the network slice NWS3. Adapted policies are applied to determine which of the two UEs is to be handed over from the cell C31. Referring to FIG. 8, it is a policy 84, applying to network slices for which that cell is not a boundary cell, that is applied to UE 312, regardless of whether UE312 is not associated with any network slice or whether UE312 is using a service associated with the network slice NWS4, and the cell C31 is a non-boundary cell of the network slice NWS4. Again referring to FIG. 8, it is a policy 82, applying to network slices for which that cell is a boundary cell, that is applied to UE311. Typically, the result will be that UE311 will not be handed over to the cell outside the coverage area of the network slice, while UE312 may be handed over.

Thus, in these examples, determining which cells form part of the coverage border of a network slice enables policies such as admission, congestion and mobility policies and control mechanisms to be optimized in a specialized manner for this cell type in order to secure SLA compliance for all slices and their associated services within the required coverage area.

In one embodiment there is disclosed a method of operation of a cell in a telecommunications network. The method comprises determining whether the cell defines at least a part of a boundary of a coverage area of a network slice; and adapting the operation of the cell, depending on whether or not the cell that defines at least a part of the boundary of the coverage area of the network slice.

Preferably, if the cell serves an UE, the operation of determining whether the cell defines at least a part of a boundary of a coverage area of a network slice comprises comparing a neighbour cell list of the cell serving the UE against a list of cells in the coverage area of the network slice; and if one or more cell appearing in said neighbour cell list does not appear in the list of cells in the coverage area of the network slice, determining that said cell serving the UE defines at least a part of the boundary of the coverage area of the network slice. Once a cell is determined to be a boundary cell the operation of this cell may be adapted accordingly as discussed earlier.

Alternatively, the operation of determining whether the cell defines at least a part of a boundary of a coverage area of a network slice comprises the following operations performed for cells in the coverage area of the network slice:
  comparing a neighbour cell list of said cell against a list of cells in the coverage area of the network slice;
  if one or more cell appearing in said neighbour cell list does not appear in the list of cells in the coverage area of the network slice, determining that said cell defines at least a part of the boundary of the coverage area of the network slice; and
  based on said determining, storing the information identifying the plurality of cells that define at least a part of the boundary of the coverage area of the network slice.

Preferably these operations are performed for each cell in the coverage area of the network slice.

The methods of the present disclosure may be implemented in hardware, or as software modules running on processing circuitry comprising one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, and in particular a tangible computer readable medium, or it could, for example, be in the form of a signal such as a downloadable data signal provided from an Internet website, or it could be in any other form.

In certain embodiments, the network node can be considered as comprising: a first storing module, for storing information defining at least one network slice; a second storing module, for storing information for each defined network slice, identifying a plurality of cells that define at least a part of a boundary of a coverage area of the network slice; and an adapting module, for adapting the operation of a cell depending on whether or not the cell defines at least a part of the boundary of the coverage area of the network slice.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of operation of a network node in a telecommunications network, the method comprising:
    storing information defining at least one network slice;
    comparing a neighbor cell list of a cell serving a user equipment against a list of cells in a coverage area of the network slice;
    when one or more cells appearing in said neighbor cell list do not appear in the list of cells of the coverage area of the network slice, determining that the cell serving the user equipment defines at least a part of a boundary of the coverage area of the network slice;
    for at least one defined network slice, storing information identifying a plurality of cells serving one or more user equipment that define at least a part of the boundary of the coverage area of the network slice; and
    adapting the operation of a cell depending on whether or not the cell defines at least a part of the boundary of the coverage area of the network slice.

2. A method according to claim 1, further comprising storing information defining a slice type of each defined network slice.

3. A method according to claim 1, further comprising, for a plurality of cells in the coverage area of the network slice:
    comparing a neighbour cell list of said cell against a list of cells in the coverage area of the network slice;
    if one or more cell appearing in said neighbour cell list does not appear in the list of cells in the coverage area of the network slice, determining that said cell defines at least a part of the boundary of the coverage area of the network slice; and
    based on said determining, storing the information identifying the plurality of cells that define at least a part of the boundary of the coverage area of the network slice.

4. A method according to claim 3, comprising performing said steps for each cell in the coverage area of the network slice.

5. A method according to claim 1, wherein the step of adapting the operation of a cell comprises:
    when providing service to a user equipment device by means of a defined network slice, adapting the service depending on whether or not the user equipment device is in a cell that defines at least a part of the boundary of the coverage area of the network slice.

6. A method according to claim 5, wherein the step of adapting the service provided to a user equipment device comprises determining whether to admit the user equipment device to the cell.

7. A method according to claim 5, wherein the step of adapting the service provided to a user equipment device comprises determining whether to handover the user equipment device from the cell.

8. A method according to any of claims 1, comprising:
    determining whether a cell served by a radio node is a boundary cell of one or more network slice; and
    if the cell is not a boundary cell of any network slice, powering down the radio node to save energy if one or more criterion is met; and
    if the cell is a boundary cell of one or more network slice, keeping the radio node powered up, even if the one or more criterion is met.

9. A network node for a telecommunications network, the network node comprising:
    a processing circuitry; and
    a memory;

the memory containing instructions executable by the processing circuitry such that the network node is operative to:

store information defining at least one network slice;

compare a neighbor cell list of a cell serving a user equipment against a list of cells in a coverage area of the network slice;

when one or more cells appearing in said neighbor cell list do not appear in the list of cells of the coverage area of the network slice, determining that the cell serving the user equipment defines at least a part of a boundary of the coverage area of the network slice;

for at least one defined network slice, store information identifying a plurality of cells serving one or more user equipment that define at least a part of the boundary of the coverage area of the network slice; and adapt the operation of a cell depending on whether or not the cell defines at least a part of the boundary of the coverage area of the network slice.

10. A network node according to claim 9 operative to store information defining a slice type of each defined network slice.

11. A network node according to claim 9 operative to, for a plurality of cells in the coverage area of the network slice:

compare a neighbour cell list of said cell against a list of cells in the coverage area of the network slice;

if one or more cell appearing in said neighbour cell list does not appear in the list of cells in the coverage area of the network slice, determine that said cell defines at least a part of the boundary of the coverage area of the network slice; and based on said determining, store the information identifying the plurality of cells that define at least a part of the boundary of the coverage area of the network slice.

12. A network node according to claim 11 operative to perform said steps for each cell in the coverage area of the network slice.

13. A network node according to one of claim 9, wherein to adapt the operation 15 of a cell the network node is operative to:

when providing service to a user equipment device by means of a defined network slice, adapt the service depending on whether or not the user equipment device is in a cell that defines at least a part of the boundary of the coverage area of the network slice.

14. A network node according to claim 13, wherein to adapt the service provided to a user equipment device the network node is operative to determine whether to admit the user equipment device to the cell.

15. A network node according to claim 13, wherein to adapt the service provided to a user equipment device the network node is operative to determine whether to handover the user equipment device from the cell.

16. A network node according to one of claim 9, wherein to adapt the operation of a cell the network node is operative to:

determine whether a cell served by a radio node is a boundary cell of one or more network slice; and if the cell is not a boundary cell of any network slice, power down the radio node to save energy if one or more criterion is met; and if the cell is a boundary cell of one or more network slice, keep the radio node powered up, even if the one or more criterion is met.

17. A computer program product, comprising a non-transitory computer readable medium, containing computer readable instructions for causing a processor to perform a method comprising:

storing information defining at least one network slice;

comparing a neighbor cell list of a cell serving a user equipment against a list of cells in a coverage area of the network slice;

when one or more cells appearing in said neighbor cell list do not appear in the list of cells of the coverage area of the network slice, determining that the cell serving the user equipment defines at least a part of a boundary of the coverage area of the network slice;

for at least one defined network slice, storing information identifying a plurality of cells that serve one or more user equipment that define at least a part of the boundary of the coverage area of the network slice; and adapting the operation of a cell depending on whether or not the cell defines at least a part of the boundary of the coverage area of the network slice.

* * * * *